US011113606B2

(12) United States Patent
Sekii

(10) Patent No.: US 11,113,606 B2
(45) Date of Patent: Sep. 7, 2021

(54) LEARNING METHOD, LEARNING DEVICE, PROGRAM, AND RECORDING MEDIUM

(71) Applicant: Konica Minolta, Inc., Tokyo (JP)

(72) Inventor: Taiki Sekii, Takatsuki (JP)

(73) Assignee: Konica Minolta, Inc., Tokyo (JP)

( * ) Notice: Subject to any disclaimer, the term of this patent is extended or adjusted under 35 U.S.C. 154(b) by 81 days.

(21) Appl. No.: 16/679,620

(22) Filed: Nov. 11, 2019

(65) Prior Publication Data

US 2020/0175376 A1 Jun. 4, 2020

(30) Foreign Application Priority Data

Nov. 30, 2018 (JP) .............................. JP2018-225420

(51) Int. Cl.
*G06N 3/08* (2006.01)
*G06K 9/00* (2006.01)
*G06K 9/62* (2006.01)
*G06T 7/00* (2017.01)

(52) U.S. Cl.
CPC ......... *G06N 3/084* (2013.01); *G06K 9/00201* (2013.01); *G06K 9/00577* (2013.01); *G06K 9/6256* (2013.01); *G06T 7/0002* (2013.01); *G06T 2207/20081* (2013.01)

(58) Field of Classification Search
CPC ........ G06N 3/084; G06N 3/0454; G06N 3/08; G06N 3/04; G06N 3/088; G06N 3/0472; G06N 3/0481; G06N 3/02; G06N 3/0445; G06N 3/063; G06N 5/045; G06K 9/00201; G06K 9/6256; G06K 9/00577; G06K 9/6262; G06K 9/6255; G06K 9/4628; G06K 9/6267; G06K 9/00335; G06K 9/00362; G06K 9/00671; G06K 9/627; G06T 7/0002; G06T 7/11; G06T 7/194; G06T 7/73; G06T 2207/20081-20084
See application file for complete search history.

(56) References Cited

U.S. PATENT DOCUMENTS

| | | | | |
|---|---|---|---|---|
| 10,346,721 | B2 * | 7/2019 | Albright | G06T 11/60 |
| 10,860,836 | B1 * | 12/2020 | Tyagi | G06N 3/0454 |
| 10,867,444 | B2 * | 12/2020 | Russell | G06F 3/017 |
| 10,885,386 | B1 * | 1/2021 | Evans | G06K 9/4604 |
| 2014/0328537 | A1 * | 11/2014 | Schertler | G06K 9/6256 382/160 |
| 2017/0061625 | A1 * | 3/2017 | Estrada | G06N 3/0454 |

(Continued)

FOREIGN PATENT DOCUMENTS

JP 2018-124939 8/2018

*Primary Examiner* — Michael S Osinski
(74) *Attorney, Agent, or Firm* — BakerHostetler

(57) ABSTRACT

Disclosed is a learning method that may include generating learning data that may contain a composite image including a CG model of an object and may contain a training signal of the object. Further disclosed is a way of learning a recognition function of recognizing information regarding the object from the composite image by neuro computation using the learning data, the generated learning data including new learning data on the basis of a gradient of error for each of pixels of the composite image, which may be calculated from the composite image and the training signal by backpropagation. The disclosed learning may include learning the recognition function by using the new learning data.

13 Claims, 5 Drawing Sheets

(56) References Cited

U.S. PATENT DOCUMENTS

| | | | |
|---|---|---|---|
| 2017/0177746 A1* | 6/2017 | Gotou | G06F 30/00 |
| 2017/0364733 A1* | 12/2017 | Estrada | G06N 3/0454 |
| 2018/0122114 A1* | 5/2018 | Luan | G06T 7/73 |
| 2018/0181802 A1* | 6/2018 | Chen | G06N 3/0454 |
| 2018/0253865 A1* | 9/2018 | Price | G06N 3/0454 |
| 2018/0268255 A1* | 9/2018 | Surazhsky | G06N 3/0454 |
| 2018/0308281 A1* | 10/2018 | Okoyama | G06T 7/187 |
| 2019/0080457 A1* | 3/2019 | Shukla | G06N 3/02 |
| 2019/0102601 A1* | 4/2019 | Karpas | G06N 3/0454 |
| 2019/0205667 A1* | 7/2019 | Avidan | G06N 3/08 |
| 2019/0251401 A1* | 8/2019 | Shechtman | G06T 11/00 |
| 2019/0251612 A1* | 8/2019 | Fang | G06Q 30/0621 |
| 2019/0370666 A1* | 12/2019 | Ros Sanchez | G06N 3/088 |
| 2019/0370969 A1* | 12/2019 | Katzmann | G06N 3/0454 |
| 2020/0050890 A1* | 2/2020 | Aizawa | G06K 9/00697 |
| 2020/0057904 A1* | 2/2020 | Amon | G06K 9/38 |
| 2020/0160105 A1* | 5/2020 | Kehl | G06K 9/6256 |
| 2020/0294201 A1* | 9/2020 | Planche | G06K 9/40 |
| 2020/0320769 A1* | 10/2020 | Chen | G06K 9/6256 |
| 2020/0357157 A1* | 11/2020 | Edwards | G06K 9/00281 |
| 2021/0034978 A1* | 2/2021 | Kato | G06N 3/04 |
| 2021/0049351 A1* | 2/2021 | Hosoi | G06T 7/00 |
| 2021/0117989 A1* | 4/2021 | Chen | G06F 30/10 |
| 2021/0166426 A1* | 6/2021 | McCormac | G05D 1/0253 |

* cited by examiner

LEARNING METHOD, LEARNING DEVICE, PROGRAM, AND RECORDING MEDIUM

CROSS REFERENCE TO RELATED APPLICATIONS

This application claims priority to Japanese Application No. 2018-225420, filed on Nov. 30, 2018, which is incorporated herein by reference in its entirety.

BACKGROUND

Technological Field

The present disclosure relates to a learning method, a learning device, a program, and a recording medium for learning a recognition function of a neural network that recognizes object information from a composite image including a computer graphics (CG) model of an object. A CG model refers to an image or image data created by CG technology.

Description of the Related Art

A technology for learning and recognizing information regarding an object (existence/non-existence of an object, type of object, operation of the object, etc.) in an image by using a deep neural network (DNN) is useful for many applications such as a surveillance camera system. In a case where there are many variations in the appearance and external view of the object regarding the information of the object being a recognition target, the human cost of preparing learning data (image and training signal) of the assumed scene would increase.

Conventionally, automatic generation of learning data using a CG model has been attempted to reduce human costs. For example, in JP 2018-124939 A (refer to claim 1, paragraph [0017], FIG. 1, etc.), training image data is generated by superimposing a background image and a CG model.

In the conventional case, however, where learning data is automatically generated by using a CG model, parameters related to variations of the CG model to be generated have been preliminarily set by a person (user). This results in a problematic situation in which images with low learning effects are generated, for example, scenes generated by CG technology are redundant (for example, similar), and the learning performed using such images leads to deterioration of accuracy in recognizing information regarding objects in the image.

SUMMARY

The present disclosure has been made to solve one or more of the above-described problems, and aims to provide a learning method, a learning device, a program, and a recording medium that may be capable of obtaining an image having a high learning effect as an image including a CG model of an object, and capable of improving image recognition accuracy by the learning using the image.

To achieve the abovementioned object, according to an aspect of the present disclosure, a learning method reflecting one aspect of the present disclosure may comprise generating learning data that contains a composite image including a CG model of an object and contains a training signal of the object, and learning a recognition function of recognizing information regarding the object from the composite image by neuro computation using the learning data, wherein the generating learning data includes generating new learning data on the basis of a gradient of error for each of pixels of the composite image calculated from the composite image and the training signal by backpropagation. The disclosed learning may include learning the recognition function by using the new learning data.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Hereinafter, one or more embodiments of the present disclosure will be described with reference to the drawings. However, the scope of the disclosure is not limited to the disclosure embodiments.

[Configuration of Learning Device]

Figure 1:
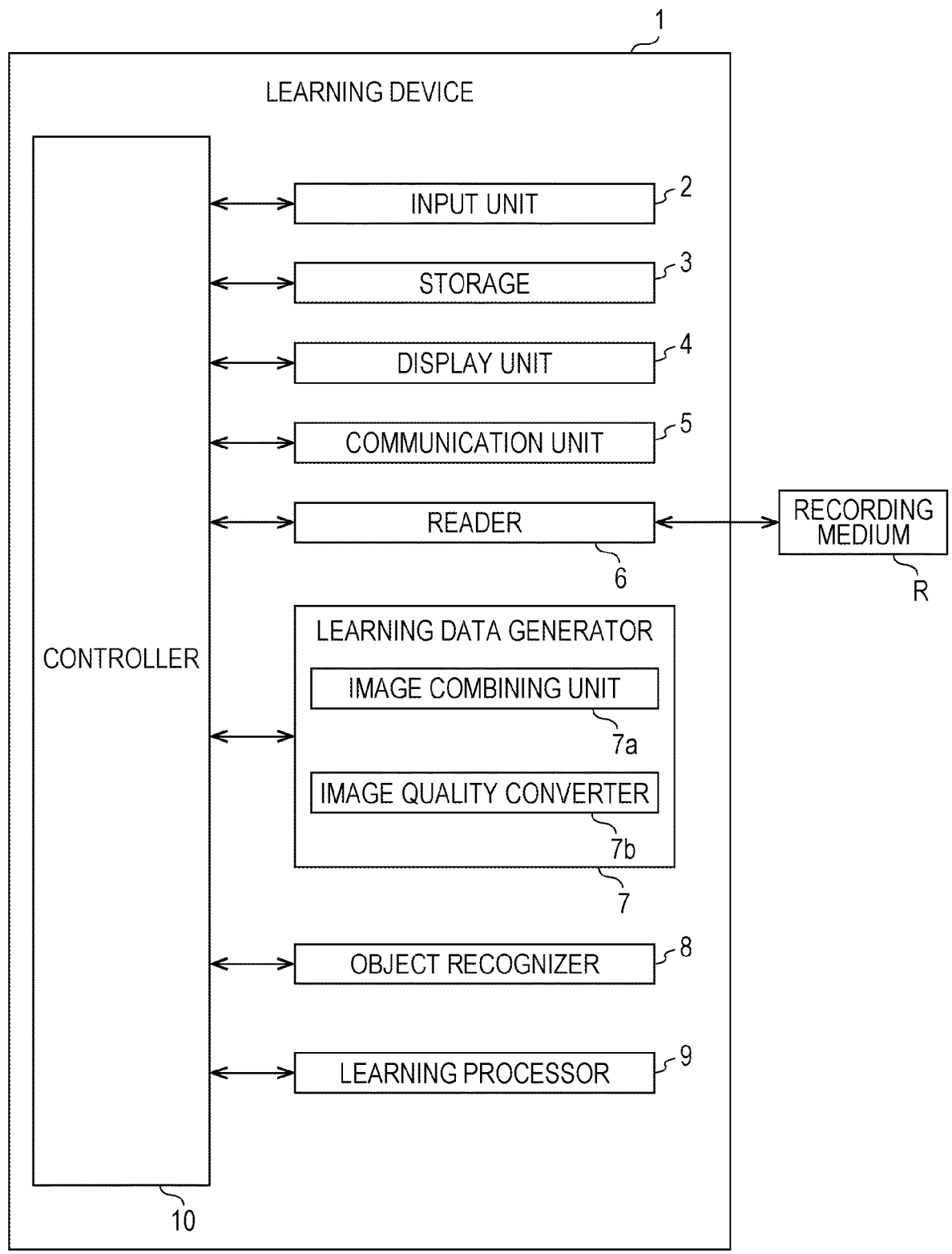
FIG. 1 is a block diagram illustrating a schematic configuration of a learning device according to an embodiment of the present disclosure.

FIG. 1 is a block diagram illustrating a schematic configuration of a learning device 1 according to the present embodiment. The learning device 1 is implemented by a terminal device such as a personal computer, for example. The learning device 1 includes an input unit 2, storage 3, a display unit 4, a communication unit 5, a reader 6, a learning data generator 7, an object recognizer 8, a learning processor 9, and a controller 10.

The input unit 2 includes a keyboard, a mouse, a touch pad, a touch panel, for example, and receives various instruction inputs from the user.

The storage 3 is a memory that stores various types of data. The various types of data include an operation program of the controller 10 and data necessary for generating learning data to be described below, that is, a CG model of an object, other models (for example, a background image), a training signal of the object. The training signal includes information, for example, a label indicating the correct class of the object, the position of the object (position in each of XYZ axes directions), the rotation angle of the object (rotation angle around each of XYZ axes), or the color of the object. Data necessary for generating learning data may be stored in a terminal device or a server external to the learning device 1.

The storage 3 like this is implemented by a hard disk, for example, but also can be implemented by appropriately selecting from various types of recording media such as random access memory (RAM), read only memory (ROM), an optical disk, a magneto-optical disk, and nonvolatile memory.

The display unit 4 is a device that displays various types of information, and implemented by a liquid crystal display device, for example. The communication unit 5 is an interface for communicating with an external terminal device or a server, and includes an input/output terminal or the like. The communication form between the learning device 1 and an external terminal device or the like may be communication via a communication line such as a wired cable or a local area network (LAN), or may be wireless communication. In the latter case, that is, in wireless communication, the communication unit 5 further includes an antenna, a transmission/reception circuit, a modulation circuit, a demodulation circuit, or the like.

The reader 6 is a device that reads information recorded on a recording medium R (for example, an operation program of the controller 10), and implemented by a disk drive, for example. When the recording medium R uses portable nonvolatile memory, the reader 6 includes a connection port into which the connection part of the nonvolatile memory is inserted.

The learning data generator 7, the object recognizer 8, and the learning processor 9 are implemented by a graphics processing unit (GPU), for example. The GPU is an arithmetic device specialized for realtime image processing.

The learning data generator 7 generates learning data that contains a composite image including a CG model of the object and contains a training signal of the object. The generation of such learning data can be performed by a procedure in which the learning data generator 7 reads the CG model of the object and other models from the storage 3 and combines the models to generate a composite image, while reading the training signal of the object from the storage 3, and then combining the composite image and the training signal.

In particular, the learning data generator 7 includes an image combining unit 7a and an image quality converter 7b. The image combining unit 7a generates a composite image by combining the CG model of the object stored in the storage 3 with another model. Note that the other model may be a CG model or an image acquired by shooting with a camera.

The image quality converter 7b converts the composite image generated by the image combining unit 7a into an image having a different image quality from the composite image. For example, the image quality converter 7b converts the image quality so that a composite image obtained by combining a plurality of CG models can increase similarity to a realistic image (image not looking like a CG image, obtained by actual shooting). An applicable example of this image quality conversion technology includes Diverse Image-to-Image Translation via Disentangled Representations (DRIT).

The image quality converter 7b is implemented by a network capable of machine learning, such as a convolutional neural network (CNN). An image obtained with respect to the input of the composite image is an image having the image quality of the composite image converted by calculation by the CNN. Accordingly, the image quality converter 7b can be defined as a device to convert the composite image generated by the image combining unit 7a into a different image quality by neuro computation. In the present embodiment, it is not always necessary to perform image quality conversion by the image quality converter 7b, and thus, the image quality converter 7b can be omitted from the configuration of the learning data generator 7.

The object recognizer 8 is implemented by a CNN, for example, recognizes (estimates) object information included in an input image by neuro computation, and outputs a recognition result. The recognition result includes the estimated class (type) and score of the object.

The learning processor 9 learns the recognition function of the object recognizer 8 by using the learning data (composite image and training data) generated by the learning data generator 7. Here, "learning the recognition function" means that adjusting the weight of each of nodes forming a convolutional layer, a pooling layer, and an output layer of a CNN on the basis of an error between the recognition result of CNN and the training signal, in a case where the object recognizer 8 is formed with the CNN as in the present embodiment.

The controller 10 is implemented by a central processing unit (CPU), for example, and operates in accordance with an operation program stored in the storage 3 so as to control operation of each of portions of the learning device 1.

[Learning Method]

Figure 2:
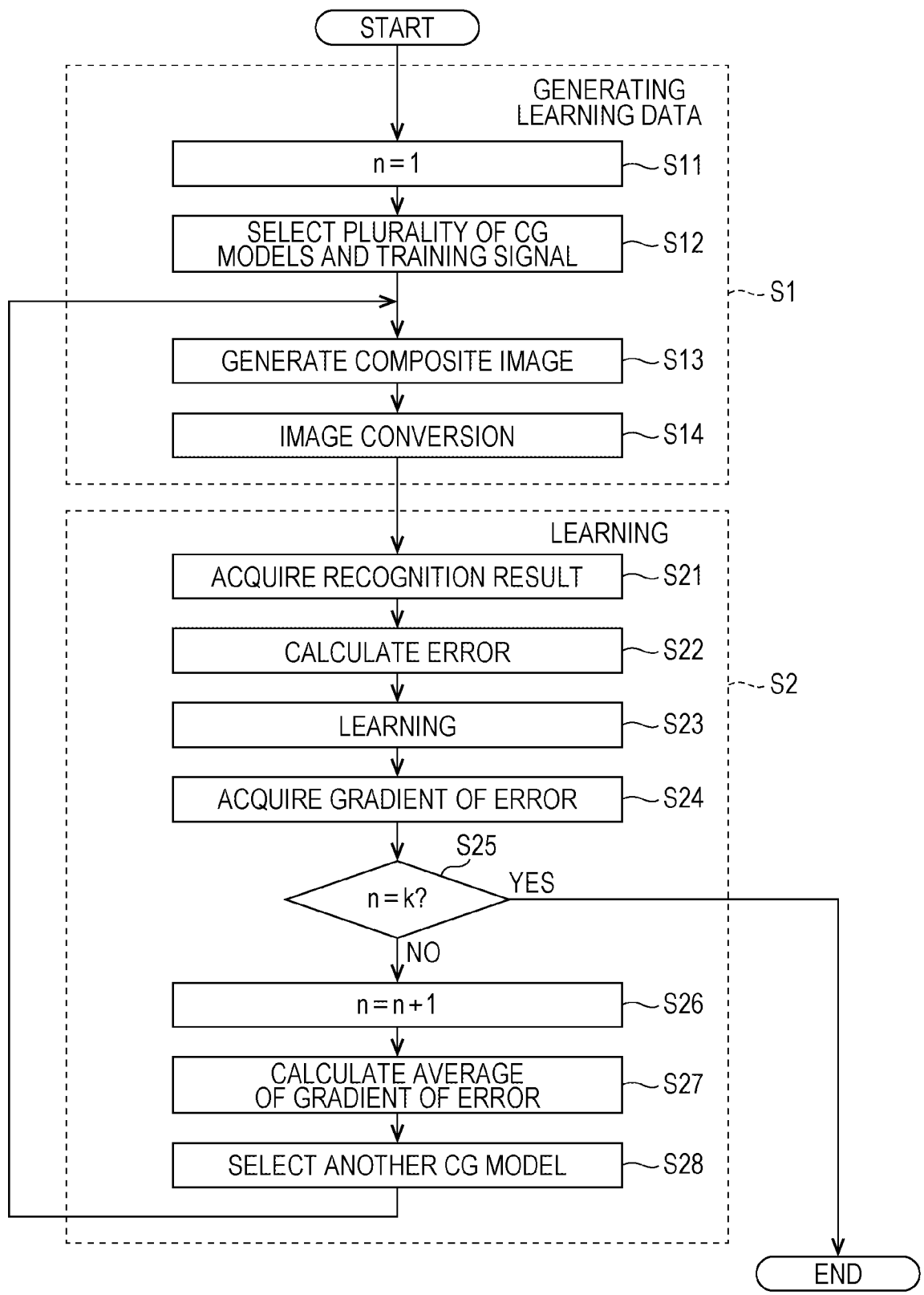
FIG. 2 is a flowchart illustrating a flow of processing of a learning method performed by the learning device.
Figure 3:
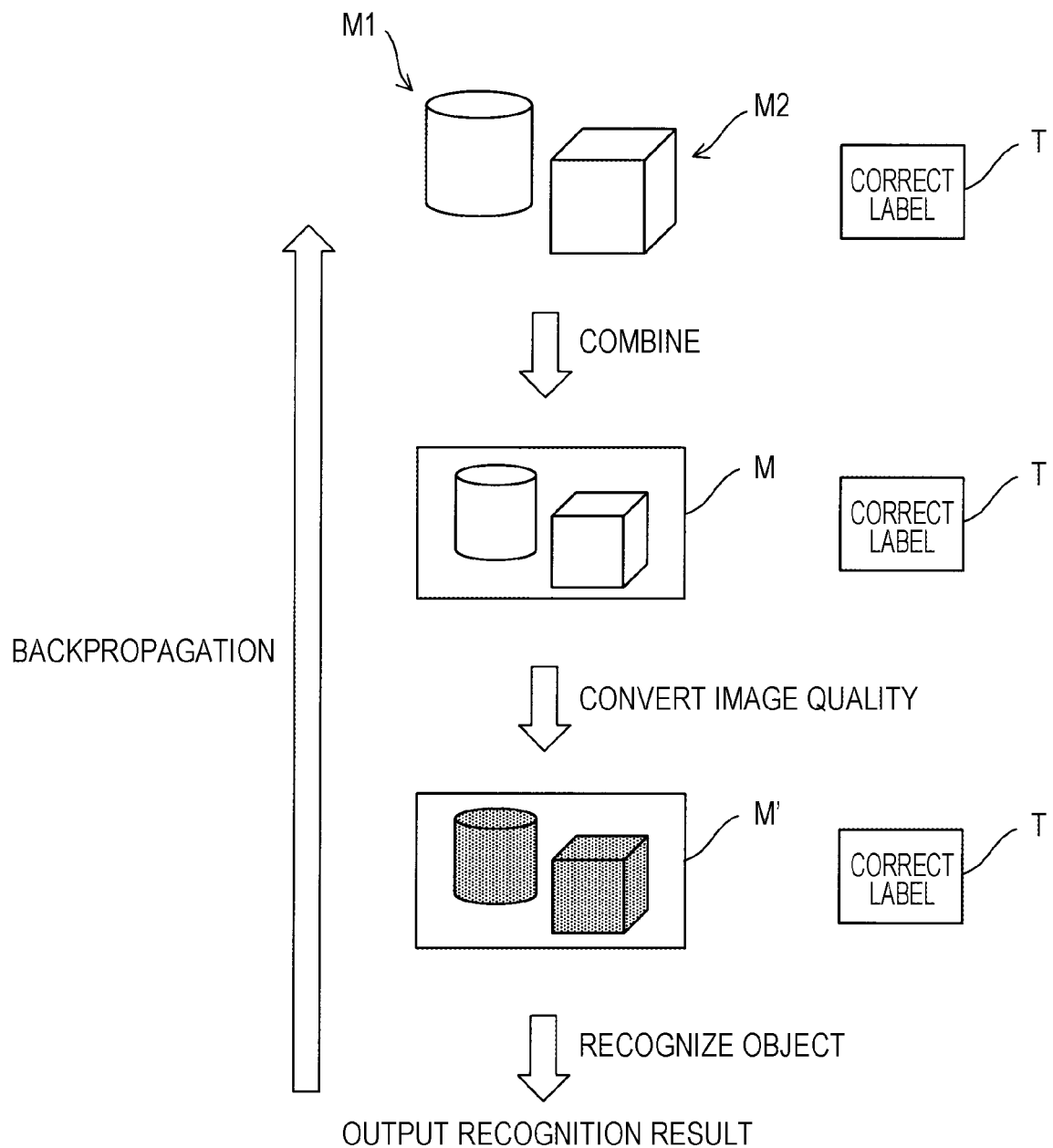
FIG. 3 is an explanatory view schematically illustrating the processing performed by the learning method.

Next, a learning method of the present embodiment will be described. FIG. 2 is a flowchart illustrating a flow of processing of a learning method performed by the learning device 1 in FIG. 1. FIG. 3 is an explanatory view schematically illustrating processing performed by the learning method. The learning method of the present embodiment includes a learning data generation step (S1) and a learning step (S2). Hereinafter, details will be described.

(S1; Learning Data Generation Step)

In S1, first, a count value n of a counter (not illustrated) of the controller 10 is set to n=1 (S11). Here, the count value n is a value indicating the number of times of learning. Subsequently, the learning data generator 7 generates learning data that contains a composite image including a CG model of the object and contains a training signal of the object.

For example, the image combining unit 7a of the learning data generator 7 randomly selects and reads out both an object CG model M1 (also referred to as a "foreground object image" for convenience) and another CG model M2 (also referred to as a "background object image" for convenience) from a plurality of (prepared) CG models stored in the storage 3, while reading out the training signal T of the object (S12). Subsequently, the read CG models M1 and M2 are combined by the CG technology to generate a composite image M (S13), and the composite image M is combined with the training signal T to be the learning data. The CG model M1 of object, the CG model M2, and the training signal T can be represented by, for example, "bird", "ground", and "a label indicating a bird", respectively. The number of CG models to be read from the storage 3 may be three or more.

Subsequently, the image quality converter 7b (CNN) of the learning data generator 7 converts the quality of the composite image M into a different image quality by neuro computation (S14). With this operation, it is possible to obtain a composite image M' closer to the image captured by a camera, compared with the composite image M. The step of S14 is to be performed as needed. Hereinafter, the "composite image M'" can be appropriately replaced with the "composite image M".

(S2; Learning Step)

Next, using the learning data created in S1, the learning processor 9 learns a recognition function of recognizing information regarding an object included in the composite image M' from the composite image M' by neuro computation. More specific procedure of this is as follows.

First, the composite image M' is input to the object recognizer 8 (CNN), and the object recognizer 8 obtains an object recognition result by neuro computation (S21). The learning processor 9 calculates an error E between the recognition result of the object and the training signal T (S22), and applies backpropagation on the error in order of the object recognizer 8 and the image quality converter 7b (backpropagation) so as to learn a CNN forming the object recognizer 8 and the image quality converter 7b (S23). This operation enables the learning processor 9 to obtain the gradient of error for each of pixels of the composite image M before conversion (S24).

Here, the "gradient of error" refers to a value (∂E/∂y) obtained by applying partial differentiation on the error E of the object recognition result with an output value y of the CNN node, and indicates a term that appears by a chain of differentiation in an arithmetic expression for obtaining a partial differential value (∂E/∂w) of the error E with respect to a weight w of the node by backpropagation.

That is, here is an example in which a signal yi is received from each of nodes of the i-th layer from the input side, the value is multiplied by each of weights $w_{ij}$ and all results are summed to obtain a value vj, and this value vj is input to the j-th layer from the input side. In this case, $$vj = \Sigma(w_{ij} \cdot yi)$$

holds. Next, an output yj of the jth layer is calculated using this value vj as input, as follows:

$$yj = \varphi j(vj)$$

Here, φ is an activation function.

When applying partial differentiation on the error E with the weight $w_{ij}$, $$\partial E/\partial w_{ij} = (\partial E/\partial yj) \cdot (\partial y/\partial vj) \cdot (\partial vj/\partial w_{ij})$$ holds due to the chain rule of differentiation. The first term on the right side of the above equation corresponds to the "gradient of error" described above. The "gradient of error" indicates how much the input value yj of the j-th layer, that is, the output value (pixel value) of each of nodes of the i-th layer affects the error E. Therefore, defining the i-th layer as the CNN input layer would make it possible to obtain the gradient of error for each of pixels of the input image, that is, the gradient of error for each of pixels of the composite image M. Even when the number of CNN layers is further increased, the gradient of error for each of pixels of the composite image M can be obtained on the basis of the concept (differential chain) similar to the description above.

Next, the learning processor 9 determines whether the count value n has reached a predetermined value k (S25). The predetermined value k is a value preset by the user as the number of times of learning of the object recognizer 8. The predetermined value k may be set as a default value. In a case where n=k in S25, it is determined that the learning by the object recognizer 8 has been performed a predetermined number of times, and the process is finished.

In contrast, in a case where n=k is not established in S25, the learning processor 9 increments the count value n to set n=n+1 (S26). Next, for each of the CG model M1 and CG model M2 used to combine the composite image M, the learning processor 9 calculates an average of all pixels (regions of each of models) of an absolute value of the gradient of error obtained above (S27). Subsequently, the learning processor 9 specifies a CG model other than the CG model having the highest average among the CG model M1 and the CG model M2, and randomly selects another CG model to replace the specified CG model, from the storage 3 (S28).

Figure 4:
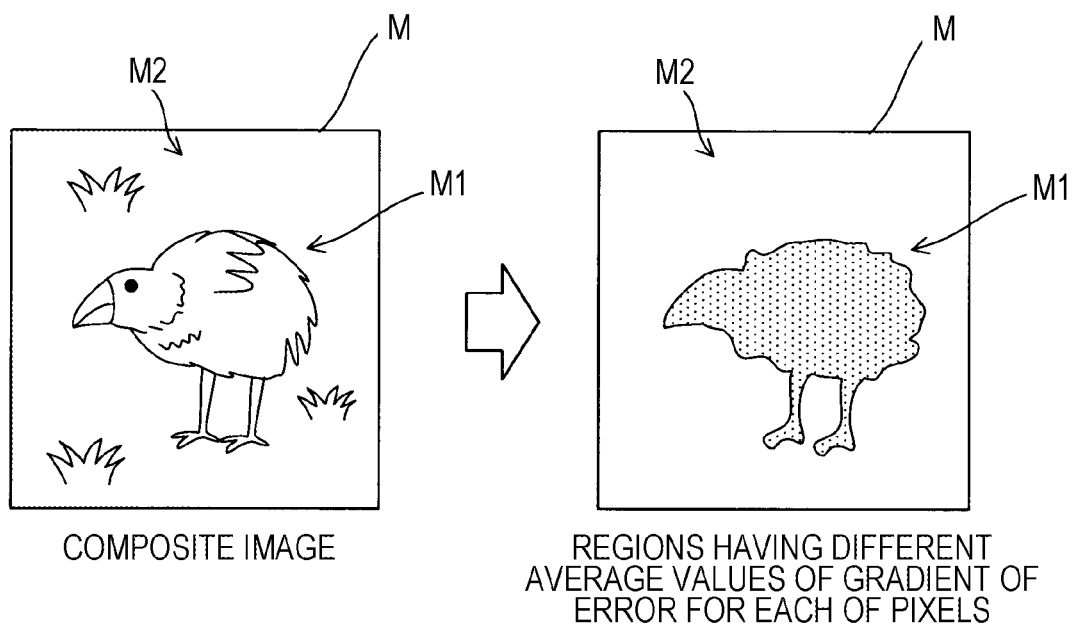
FIG. 4 is an explanatory view schematically illustrating regions in which the absolute values of gradients of errors are different in a composite image.

FIG. 4 schematically illustrates regions, in the composite image M, having various absolute values of the gradient of error. In the figure, the hatched region indicates that the absolute value of the gradient of error is larger than a threshold compared to the unhatched region. That is, in the example of the figure, the average of the absolute value of the gradient of error is larger in the CG model M1 (foreground object image) of the object than in the CG model M2 (background object image). In this case, the learning processor 9 determines that the CG model M2 having a smaller average absolute value of the gradient of error as a CG model to be replaced with another CG model.

In a case where there are three or more CG models that make up the composite image, it would be preferable to specify at least one CG model other than the CG model with the highest average absolute value of the gradient of error, and to select the other CG model to replace the specified CG model from the storage 3. That is, there may be two or more CG models to be replaced with other CG models in the composite image.

Next, returning to S13, the learning data generator 7 replaces a part of the composite image M with the other CG model selected in S28. S13 and subsequent steps are repeated until n=k is established in S25, that is, until the number of times of learning reaches a predetermined number. Accordingly, in the second and subsequent learning steps, the recognition function of the object recognizer 8 is learned using the learning data having the composite image after replacement with the other CG model (S21 to S23).

(Effects)

As described above, in the learning data generation step of S1, a part of the composite image M is replaced with another CG model on the basis of the gradient of error for each of pixels of the composite image M calculated from the composite image M (or M') and the training signal T by the backpropagation, and generates new learning data (S13). This makes it possible to obtain a composite image in which an error between the recognition result of the object information by the neuro computation in the object recognizer 8 and the training signal T is larger than the error before the replacement. That is, it is possible to obtain a composite image having a higher learning effect (higher difficulty in recognition) than a composite image with variations generated by setting parameters by a person. Therefore, performing, in the learning step of S2, learning of the recognition function of the object recognizer 8 using the new learning data including the composite image after replacement with another CG model (S23) would make it possible to achieve a high learning effect, leading to improved image recognition accuracy in the object recognizer 8.

In particular, the learning processor 9 calculates the average of the absolute value of the gradient of error for each of pixels for each of the plurality of CG models included inn the composite image M (S27), and the learning data generator 7 replaces the CG model other than the CG model highest average with another CG model (S13). In this manner, replacing the CG model included in the composite image with another CG model on the basis of the gradient of error for each of pixels makes it possible to reliably obtain a composite image having a larger error between the recognition result in the object recognizer 8 and the training signal T, compared with the error before the replacement. Accordingly, performing the learning using new learning data including the composite image after replacement makes it possible to reliably obtain a high learning effect, leading to an improved image recognition accuracy.

Furthermore, the learning data generation step of S1 converts the quality of the composite image M to a different image quality by neuro computation (S14). This image quality conversion makes it possible to obtain a composite image M' in which an error between the recognition result obtained by the neuro computation in the object recognizer 8 and the training signal T becomes larger than that the case where the image quality conversion is not performed. Therefore, performing learning of S2 using such a composite image M' makes it possible to obtain a higher learning effect and further improve the image recognition accuracy.

[Other Learning Methods]

Figure 5:
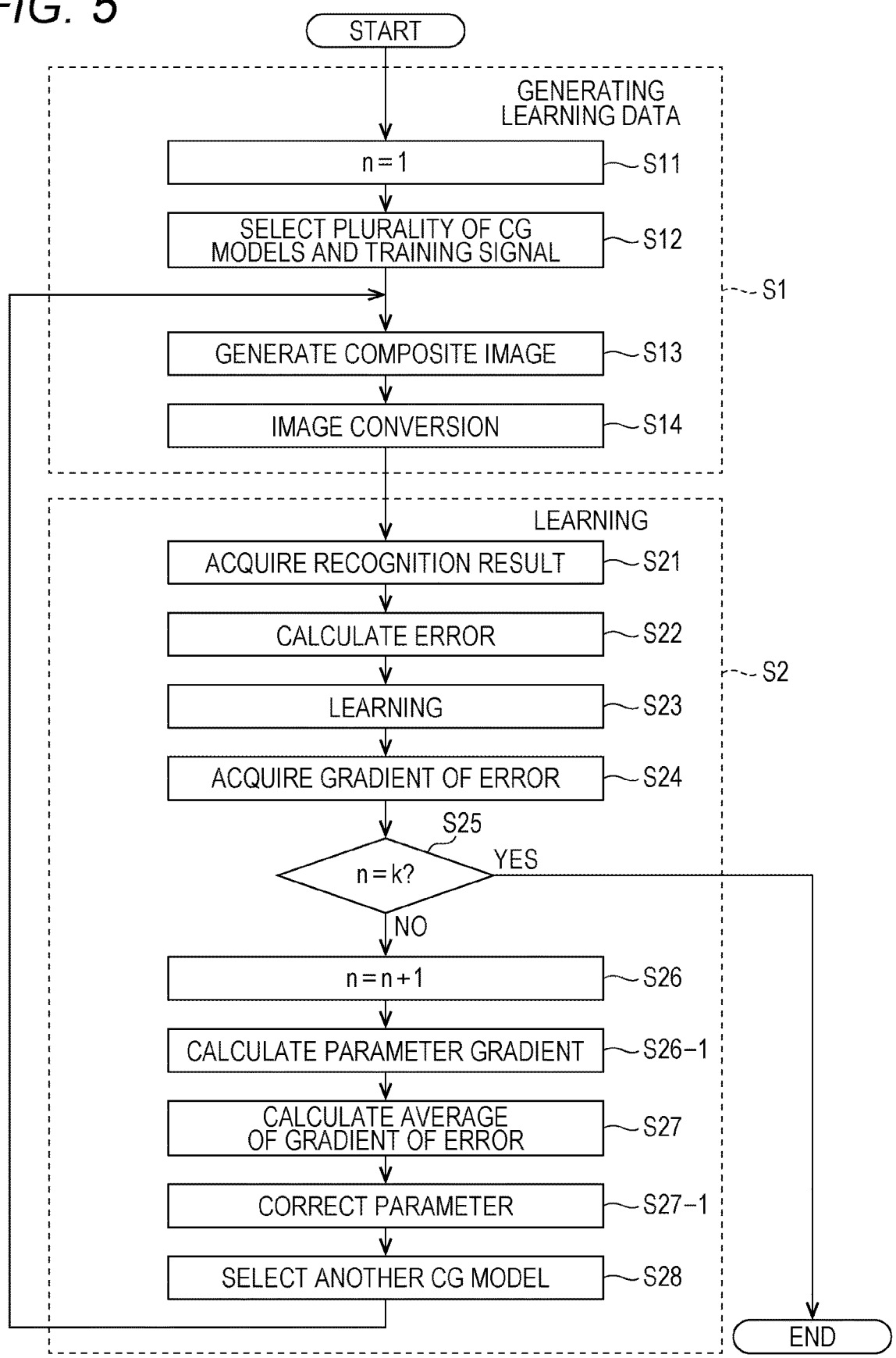
FIG. 5 is a flowchart illustrating a flow of processing of another learning method performed by the learning device.

FIG. 5 is a flowchart illustrating a flow of processing of another learning method performed by the learning device 1 of the present embodiment. In FIG. 5, in the learning step of S2 described above, a step of calculating a parameter gradient (S26-1) is added between S26 and S27, and a parameter correction step (S27-1) is added between S27 and S28. The rest is similar to the flowchart of FIG. 2. Hereinafter, differences from FIG. 2 will be described.

In S26-1, the learning processor 9 calculates a parameter gradient related to the parameter of the CG model M1 of the object by using the gradient of error for each of pixels of the composite image M acquired in S24. Here, examples of parameters of the CG model M1 include information regarding at least one of a three-dimensional position, an angle, a color, a pattern, a shape, a reflection characteristic, or an illumination condition of an object (for example, a bird). Specifically, the parameter gradient is obtained by differentiating the gradient of error with the parameter of the CG model M1 of the object. The parameter gradient indicates how much the parameter of the object CG model M1 affects the gradient of error.

In S27-1, the parameter is corrected by adding a value obtained by multiplying the parameter gradient calculated in S26-1 by a predetermined negative coefficient to the parameter of the CG model M1 of the object (for example, the three-dimensional position of the object).

In this manner, the parameter gradient is obtained in S26-1, and the parameter of the CG model M1 of the object is corrected on the basis of the parameter gradient in S27-1, making it possible, for example, to correct the above-described parameter in a direction to increase the error between the object recognition result obtained by the object recognizer 8 the training signal T. With this configuration, it is possible to replace a part of the composite image with another CG model (S13), and obtain a composite image with a higher learning effect (higher difficulty in recognition). Accordingly, performing the learning for the object recognizer 8 using new learning data including the above composite image (S23) makes it possible to further enhance the high learning effect, leading to the further improved image recognition accuracy.

Meanwhile, the parameter correction pattern increases exponentially together with an increase in the number of parameters of the CG model. For example, regarding at least the three types parameters of the object's three-dimensional position, angle, and color as the above parameters, there are 3×3×M correction patterns in total, that is, three-dimensional (each of XYZ axis directions) for the position, three-dimensional pattern (around each of XYZ axes) for the angle, and M dimensions (when there are M colors) for the color. A correction pattern can be uniquely identified by correcting a parameter (for example, a three-dimensional position) of the CG model M1 of the object on the basis of the parameter gradient, and this makes it possible to easily obtain a composite image with a high learning effect.

Furthermore, adding a value obtained by multiplying the parameter gradient calculated in S26-1 by a predetermined negative coefficient to the parameter of the object CG model M1 and correcting the above parameter makes it possible to reliably correct the above parameter in a direction of increasing the error between the recognition result obtained by the object recognizer 8 and the training signal T. This makes it possible, as a result, to reliably obtain an image having a high learning effect (higher difficulty in recognition).

The parameter of the CG model M1 of the object includes information regarding at least one of the three-dimensional position, the angle, or the color of the object. In this case, correcting the CG model M1 of the object in at least one of a three-dimensional position, an angle, a color, a pattern, a shape, a reflection characteristic, or an illumination condition of the object would make it possible to obtain an image with a large error between the recognition result and the training signal T, that is, an image with a high learning effect.

[Program and Recording Medium]

The learning device 1 described in the present embodiment can be implemented by a computer (PC) in which a predetermined program (application software) is installed, for example. The computer (for example, the controller 10 as a CPU) reads and executes the program, enabling each of portions of the learning device 1 to operate to execute the above-described processes (individual steps). It is possible to download and acquire such a program from the outside via a network and store the program in the storage 3. It is allowable to have a form in which the program is recorded on a computer-readable recording medium R such as a Compact Disk-Read Only Memory (CD-ROM), for example, and computer reads the program from the recording medium R and stores it in the storage 3.

[Others]

The learning method, learning device, program, the recording medium of the present embodiment described above can be expressed as follows.

1. A learning method including:

generating learning data that contains a composite image including a CG model of an object and contains a training signal of the object; and learning a recognition function of recognizing information regarding the object from the composite image by neuro computation using the learning data, in which the generating learning data includes generating new learning data on the basis of a gradient of error for each of pixels of the composite image calculated from the composite image and the training signal by backpropagation, and the learning includes learning the recognition function by using the new learning data.

2. The learning method according to 1, in which, on the basis of the gradient of error for each of pixels calculated for each of a plurality of CG models included in the composite image, the generating learning data includes replacing the CG model included in the composite image with another CG model.

3. The learning method according to 1 or 2, in which the generating learning data includes converting a quality of the composite image into a different image quality by neuro computation.

4. The learning method according to any of 1 to 3, in which the learning includes calculating a parameter gradient related to a parameter of the CG model of the object by using the gradient of error, and corrects the parameter of the CG model of the object on the basis of the parameter gradient.

5. The learning method according to 4, in which the learning includes correcting the parameter by adding a value obtained by multiplying the calculated parameter gradient by a predetermined negative coefficient, to the parameter of the CG model of the object.

6. The learning method according to 4 or 5, in which the parameter of the CG model of the object includes information regarding at least one of a three-dimensional position, an angle, a color, a pattern, a shape, a reflection characteristic, or an illumination condition of the object.

7. A learning device including:
a learning data generator that generates learning data that contains a composite image including a CG model of an object and contains a training signal of the object;
an object recognizer that recognizes information regarding an object included in an input image by neuro computation; and
a learning processor that learns a recognition function of the object recognizer,
in which the learning processor calculates a gradient of error for each of pixels of the composite image, from the composite image and the training signal, by backpropagation,
the learning data generator generates new learning data on the basis of the gradient of error, and
the learning processor learns the recognition function by using the new learning data.

8. The learning device according to 7, in which the learning processor calculates the gradient of error for each of pixels calculated for each of a plurality of CG models included in the composite image, and
the learning data generator replaces the CG model included in the composite image with another CG model on the basis of the gradient of error for each of pixels.

9. The learning device according to 7 or 8, in which the learning data generator converts a quality of the composite image into a different image quality by neuro computation.

10. The learning device according to any of 7 to 9, in which the learning processor calculates a parameter gradient related to a parameter of the CG model of the object by using the gradient of error, and corrects the parameter of the CG model of the object on the basis of the parameter gradient.

11. The learning device according to 10, in which the learning processor corrects the parameter by adding a value obtained by multiplying the calculated parameter gradient by a predetermined negative coefficient, to the parameter of the CG model of the object.

12. The learning device according to 10 or 11, in which the parameter of the CG model of the object includes information regarding at least one of a three-dimensional position, an angle, a color, a pattern, a shape, a reflection characteristic, or an illumination condition of the object.

13. A program for causing a computer to execute the learning method according to any of 1 to 6.

14. A computer-readable recording medium that records the program according to 13.

As described above, in the present embodiment, a CG model highly difficult in recognition is adaptively selected and corrected (replaced) on the basis of the recognition result obtained by the object recognizer 8, and the CNN of the object recognizer 8 is learned by using the corrected composite image. This enables the generation of new learning data having a higher learning effect than in the case with variations set by a person, leading to improvement of image recognition accuracy. Although "generation of new learning data" having a high learning effect can be achieved by correcting the parameters of the CG model, correcting the image quality conversion parameters, or the like, in addition to correcting the CG model, the present disclosure is not limited to these. All the elements necessary to generate an image or a training signal can be corrected in a direction of increasing the error between the recognition result of the object and the training signal on the basis of the gradient of error for each of pixels of the composite image, making it possible to be a target that can generate "new learning data" having high learning effects.

The present disclosure is applicable to a learning device that learns a recognition function of a neural network that recognizes object information from a composite image including a CG model of an object, for example.

Although embodiments of the present disclosure have been described and illustrated in detail, the disclosed embodiments are made for purposes of illustration and example only and not limitation. The scope of the present disclosure should be interpreted by terms of the appended claims and include various extensions and modifications of each of the above-described embodiments without departing from the scope and spirits of the present disclosure.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:

1. A learning method, comprising:
generating learning data that contains a composite image, including a computer graphics (CG) model of an object, and contains a training signal of the object; and
learning a recognition function of recognizing information regarding the object from the composite image by neuro computation using the learning data,
wherein the learning data is generated by generating new learning data on the basis of a gradient of error for each pixel of the composite image calculated from the composite image and the training signal by backpropagation, and
wherein the learning includes learning the recognition function by using the new learning data.

2. The learning method according to claim 1, wherein, on the basis of the gradient of error for each pixel calculated for each of a plurality of CG models included in the composite image, and
wherein the learning data is generated by replacing the CG model included in the composite image with another CG model.

3. The learning method according to claim 1, wherein the learning data is generated by converting a quality of the composite image into a different image quality by neuro computation.

4. The learning method according to claim 1, wherein the learning includes (i) calculating a parameter gradient related to a parameter of the CG model of the object by using the gradient of error and (ii) correcting the parameter of the CG model of the object on the basis of the parameter gradient.

5. The learning method according to claim 4, wherein the learning includes correcting the parameter by adding a value obtained by multiplying the calculated parameter gradient by a predetermined negative coefficient, to the parameter of the CG model of the object.

6. The learning method according to claim 4, wherein the parameter of the CG model of the object includes information regarding at least one of a three-dimensional position, an angle, a color, a pattern, a shape, a reflection characteristic, or an illumination condition of the object.

7. A learning device, comprising:
- a learning data generator configured to generate learning data that contains a composite image, including a computer graphics (CG) model of an object, and contains a training signal of the object;
- an object recognizer configured to recognize information regarding an object included in an input image by neuro computation; and
- a learning processor configured to learn a recognition function of the object recognizer,
- wherein the learning processor calculates a gradient of error for each pixel of the composite image, from the composite image and the training signal, by backpropagation,
- wherein the learning data generator generates new learning data on the basis of the gradient of error, and
- wherein the learning processor learns the recognition function by using the new learning data.

8. The learning device according to claim 7, wherein the learning processor calculates the gradient of error for each pixel calculated for each of a plurality of CG models included in the composite image, and
wherein the learning data generator replaces the CG model included in the composite image with another CG model on the basis of the gradient of error for each pixel.

9. The learning device according to claim 7, wherein the learning data generator converts a quality of the composite image into a different image quality by neuro computation.

10. The learning device according to claim 7, wherein the learning processor (i) calculates a parameter gradient related to a parameter of the CG model of the object by using the gradient of error and (ii) corrects the parameter of the CG model of the object on the basis of the parameter gradient.

11. The learning device according to claim 10, wherein the learning processor corrects the parameter by adding a value obtained by multiplying the calculated parameter gradient by a predetermined negative coefficient, to the parameter of the CG model of the object.

12. The learning device according to claim 10, wherein the parameter of the CG model of the object includes information regarding at least one of a three-dimensional position, an angle, a color, a pattern, a shape, a reflection characteristic, or an illumination condition of the object.

13. A non-transitory recording medium storing a computer readable program for causing a computer to execute the learning method according to claim 1.

* * * * *